United States Patent [19]

Van Leuwen et al.

[11] 3,899,520

[45] Aug. 12, 1975

[54] STANNOUS CATECHOL DERIVATIVES AND PROCESS FOR PREPARING THEM

[75] Inventors: Bruce G. van Leuwen; James J. Pitts, both of Hamden, Conn.

[73] Assignee: Olin Corporation, New Haven, Conn.

[22] Filed: July 2, 1973

[21] Appl. No.: 375,396

[52] U.S. Cl. ...... 260/414; 260/2.5 AB; 260/2.5 AC; 260/429.7
[51] Int. Cl. ............................................ C07c 69/00
[58] Field of Search .......................... 260/414, 429.7

[56] References Cited
UNITED STATES PATENTS

| | | | |
|---|---|---|---|
| 2,514,179 | 7/1950 | Albert | 260/429.7 |
| 2,514,180 | 7/1950 | Carr | 260/429.7 |
| 2,831,898 | 4/1958 | Ecke et al. | 260/429.7 X |
| 3,214,453 | 10/1965 | Stern | 260/429.7 |
| 3,321,361 | 5/1967 | Menn et al. | 260/414 X |
| 3,426,051 | 2/1969 | Hoch | 260/429.7 |

*Primary Examiner*—Ethel G. Love
*Attorney, Agent, or Firm*—James B. Haglind; Donald F. Clements; Thomas P. O'Day

[57] ABSTRACT

A process for the preparation of stannous catechol derivatives by the reaction of a catechol with a stannous carboxylate is disclosed. Selected novel derivatives are prepared by this process which are useful as gel catalysts in the production of flexible urethane foams.

13 Claims, No Drawings

STANNOUS CATECHOL DERIVATIVES AND PROCESS FOR PREPARING THEM

This invention relates to a select group of stannous catechol derivatives, to a novel process for preparing such derivatives, and to the use of these derivatives as gel catalysts in the preparation of polyurethane foam.

It is known in the art that stannous catecholates are of utility generally as stabilizing agents for polymeric materials such as polybutadiene rubber. These catecholates can be prepared, according to the prior art, by reacting a tin compound, such as stannous dichloride or stannous oxide with a catechol as described for example in Emeleus and Zuckerman, J. Organometal. Chem., Vol. 1, 328 (1964) and Cocks and Zuckerman, Inorg. Chem., Vol. 4, 592 (1965). However, such prior art processes, along with requiring the use of a reaction catalyst and elevated temperatures and pressures, also require extended reaction times and in addition may require a burdensome neutralization step in the recovery of the reaction product. Thus a need still exists in this art for a simple, less costly method for preparing stannous catecholates.

It is also known in the art to utilize certain organo-tin compounds, or mixtures thereof, as gel catalysts in the preparation of polyurethane foam. See for example Japanese Pat. No. 70-38,840 and U.S. Pat. Nos. 3,391,091 and 3,198,757. The most commonly used organo-tin catalyst is stannous octoate. However, because of its hydrolytic instability, this material cannot be used in polyurethane foam forming systems or preblends which are subjected to prolonged storage in a moist environment.

It is an object of the present invention to provide a relatively simple and less time-consuming process for the production of stannous catechol derivatives.

A further object is to provide novel organo-tin compositions which are hydrolytically stable and useful as gel catalysts in the production of polyurethane foam.

Briefly, in accordance with the process of the present invention stannous catechol derivatives are prepared by reacting, in the presence of a solvent, a stannous carboxylate with a catechol of formula I as follows:

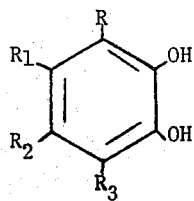

wherein each of R, $R_1$, $R_2$, and $R_3$ is independently selected from the group consisting of hydrogen, halogen, nitro, amino, nitroso, sulfonyl, alkyl having 1 to about 10 carbon atoms, and alkoxy having 1 to about 10 carbon atoms.

In practicing the process of the invention, any of the catechols represented by formula I may be used. Illustrative catechols include catechol, 3- and 4-methyl catechol, 3- and 4-tert-butyl catechol, 4-isopropyl catechol, 3,5- or 3,6-dimethyl catechol, 3,4,5,6-tetrachloro catechol, 3,4,5,6-tetrabromo catechol, 3- or 4-nitro catechol, 5-nitroso catechol, heptyl catechol, octyl catechol, sulfonyl catechol, 3-chloro-5-methyl catechol, 3,6-dibromo-4,5-dimethyl catechol, 3,5-diamino catechol, 3- or 5-methoxy catechol, 3-ethoxy catechol, 3-pentyloxy catechol, 3,5-dinitro catechol, 4-amino-5-bromo catechol, 3,4,6-tribromo-5-methyl catechol 3-methoxy-5-nitro catechol, tetrafluoro catechol, 4-(2-aminopropyl)-3-chloro catechol and 4-bromo-5-nitro catechol.

However, it is preferred to employ catechols of formula I wherein each of R, $R_1$, $R_2$, and $R_3$ is independently selected from the group consisting of hydrogen, chlorine, bromine, nitro, alkyl having 1 to about 4 carbon atoms and alkoxy having 1 to about 4 carbon atoms. Illustrative examples of these are catechol, 3- and 4-methyl catechol, 3- and 4-tert-butyl catechol, 3,4,5,6-tetrabromo catechol, 3- or 4-nitro catechol, 3-chloro-5-methyl catechol, 3,4,6-tribromo-5-methyl catechol, 3-methoxy catechol, and 4-bromo-5-nitro catechol.

The stannous carboxylate reactant used in the process of the present invention can be any compound represented by formula II as follows:

$$(R_4COO)_2 Sn$$

II wherein $R_4$ represents hydrogen, alkyl having from 1 to about 9 carbon atoms, or alkenyl having from 1 to about 9 carbon atoms. Illustrative examples include stannous formate, stannous acetate, stannous pentanoate, stannous butyrate, stannous acrylate, stannous methacrylate, stannous hexanoate, stannous butenoate, stannous pentenoate, stannous heptanoate, stannous hexenoate, stannous octanoate, stannous 2-ethyl hexanoate, stannous sorbate, stannous nonanoate, and stannous decanoate.

Preferred stannous carboxylate reactants are those in which $R_4$ represents an alky group having from about 5 to about 9 carbon atoms. Illustrative examples include stannous hexanoate, stannous octanoate and stannous 2-ethyl hexanoate.

The reaction is carried out in the presence of an inert organic solvent. By "inert" is meant that the solvent does not contain any moieties which may interfere with the reaction process. Any such liquid compound which is a solvent for one or both reactants, or a mixture of solvents, may be used. Typical examples of suitable solvents include diethyl ether, methanol, ethanol, isopropanol, acetone, dioxane, dimethylsulfoxide, tetrahydrofuran, methyl ethyl ketone, dimethyl formamide and toluene among others. To facilitate product recovery and purification, it is preferable to use a solvent having a low boiling point, e.g., at from about 30° to about 90°C. and preferably below 50°C. and in which the product is relatively insoluble, such as diethyl ether.

Any suitable amount of solvent may be employed in the reaction. Usually a sufficient amount of solvent or solvent mixture is used to dissolve each of the reactants independently. For example, the molar ratio of solvent to total reactants is from about 0.5:1 to about 100:1 preferably from about 1:1 to about 10:1.

The reaction may be carried out at any suitable temperature, for example, temperatures ranging from about 0° to about 100°C. However, since the reaction proceeds satisfactorily without heat, it is preferred, from a practical stand point, to carry out the reaction at close to ambient or room temperature such as from about 20° to about 40°C.

Although the reaction is suitably conducted at atmospheric pressure, higher or lower pressures may be used if desired.

In carrying out the reaction between the stannous carboxylate and the catechol compound, any molar ratio of stannous carboxylate to catechol may be employed, such as from about 0.1:1 to about 10:1 and preferably about 0.6:1 to about 6:1. As a practical matter, the most preferred proportions are stoichiometric molar proportions, i.e., about 1:1.

Any suitable order of mixing the reactants and the solvent may be used in carrying out the process of the invention. For example, each reactant may first be individually dissolved in the desired solvent and thereafter the two solutions placed, simultaneously or in order of addition, in a reaction vessel where reaction proceeds. Although continuous agitation is not necessary, it is preferred in order to reduce reaction time and insure complete reaction.

The reaction proceeds rapidly, being completed in less than about 4 hours and more usually in about 10–40 minutes.

The reaction product is readily recovered from the reaction mixture by filtration and thereafter easily purified by washing with an inert organic solvent such as diethyl ether.

Utilizing the process of the invention, novel stannous catechol derivatives are produced which are useful as gel catalyst in the production of polyurethane foam. These novel derivatives are represented by formulas III and IV:

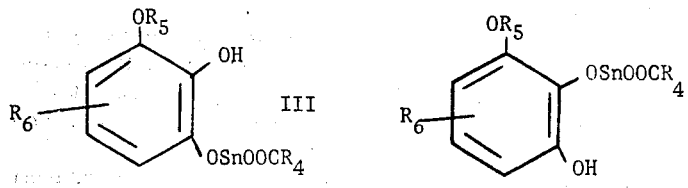

wherein $R_5$ represents alkyl having from 1 to about 10 carbon atoms, $R_4$ is as defined above and $R_6$ represents hydrogen, halogen, nitro or alkyl having 1 to about 10 carbon atoms.

The novel compounds of this invention can be any compounds illustrated by formulas III and IV, for example, [2-hydroxy-3-ethoxyphenolato (1-)] tin (II) acetate, [3-butoxy-2-hydroxy-4-nitrophenolato (1-)] tin (II) hexanoate, [2-hydroxy-5-chloro-6-methoxyphenolato (1-)] tin (II) butyrate, [3-isopropoxy-2-hydroxyphenolato (1-)] tin (II) decanoate, [2-hydroxy-3-methoxyphenolato (1-)] tin (II) octanoate, [2-hydroxy-6-methoxyphenolato (1-)] tin (II) ethyl hexanoate, [2-hydroxy-3-ethoxyphenolato (1-)] tin (II) hexanoate, [2-hydroxy-6-methoxyphenolato (1-)] tin (II) octanoate and [2-hydroxy-6-methoxyphenolato (1-)] tin (II) ethyl hexanoate.

However, preferred are those compounds of formulas III and IV wherein $R_5$ represents alkyl having from 1 to 4 carbon atoms, $R_4$ represents an alkyl group having from 5 to about 9 carbon atoms and $R_6$ represents hydrogen. Illustrative examples include [2-hydroxy-3-methoxyphenolato (1-)] tin (II) octanoate, [2-hydroxy-6-methoxyphenolato (1-)] tin (II) 2-ethyl hexanoate, [2-hydroxy-3-methoxyphenolato (1-)] tin (II) 2-ethyl hexanoate, [2-hydroxy-6-methoxyphenolato (1-)] tin (II) octanoate and [2-hydroxy-3-ethoxyphenolato (1-)] tin (II) hexanoate.

Further according to the invention, it has been found that the stannous catechol derivatives prepared by the process of the invention are useful gel catalysts for the preparation of polyurethane foam. In accordance with this embodiment of the invention any such stannous catechol derivative may be employed in foam production. This includes the derivatives represented by formulas III and IV above as well as derivatives represented by formula V as follows:

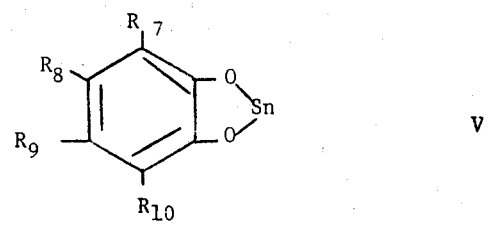

wherein each of $R_7$, $R_8$, $R_9$, and $R_{10}$ independently represents hydrogen, halogen, amine, nitro, nitroso, sulfonyl, and alkyl having 1 to about 10 carbon atoms. So far as compounds of formula V are concerned, it is preferred to employ those compounds in which each of $R_7$, $R_8$, $R_9$ and $R_{10}$ independently represents hydrogen, chlorine or bromine, nitro and alkyl having from 1 to about 4 carbon atoms.

Illustrative examples of the preferred embodiments of formula V include [1,2-benzenediolato (2-)] tin (II), [3-and 4-methyl-1,2-benzenediolato (2-)] tin (II), [tert-butyl 1,2-benzenediolato (2-)] tin (II), [3,4,5,6-tetrabromo-1,2-benzenedialoto (2-)] tin (II), [4-nitro 1,2-benzenediolato (2-)] tin (II), [3,4-dimethyl-1,2-benzenediolato (2-)] tin (II) and [3-methyl-4-tert-butyl-1,2-benzenediolato (2-)] tin II.

As noted above, the compounds prepared by the process of the present invention, or mixtures thereof, are useful as gel catalysts in the production of polyurethane foams, particularly flexible foams. In preparing polyurethane foam in accordance with the invention either the so called "one-shot method" or the "semi-prepolymer technique" ("quasi-prepolymer" technique) may be employed. Any combination of polyol components including polyester polyols or polyether polyols, organic polyisocyanate, blowing agent, blowing catalyst, and gel catalyst and other reactants capable of forming a cellular material can be used. It is well known in the art, for example, to prepare flexible polyurethane foam-forming formulations comprising a polyether polyol component having a hydroxyl number of less than about 250, an organic polyisocyanate, a blowing agent and a catalyst. Typical formulations are described in U.S. Pat. Nos. 3,072,582, issued Jan. 8, 1963, and 3,437,804, issued Oct. 17, 1967, and in Canadian Pat. No. 705,938, issued Mar. 16, 1965.

In utilizing the stannous catechol derivatives of formulas III, IV and V as described above gel catalysts in producing polyurethane foam, they are added to the polyurethane foam-forming mixture prior to foaming. Conveniently they are first blended with the polyol component used in making the foam and the blend is then added to the other ingredients of the polyurethane foam-forming reaction mixture. These derivatives can be used in any proportion which is effective as a gel catalyst in the production of polyurethane foam. For example, the gel catalyst may be employed in an amount from about 0.01 to about 5.0, and preferably from about 0.1 to about 2.0, parts by weight per 100 parts of polyol, which is used in preparing the foam.

The stannous catechol derivatives which are prepared according to the process of the present invention are generally insoluble in materials normally used in the production of polyurethane foams, for example, polyproplyene glycols, polyethylene glycols, dioctylphthalate, water, toluene diisocyanate, trichloromonofluoromethane, dimethylsulfoxide, and dimethyl formamide. Thus they can be used in foam forming formulations containing such materials without the need to employ these catalyst in excess which might otherwise be necessary to compensate for losses due to interaction with, or dissolution in, these material. These compounds also exhibit thermal stability up to about 300°C. and they are hydrolytically stable in the presence of moisture. Consequently they are particularly suitable for use in polyurethane systems which require long storage times or stability in the presence of moisture.

The process of the present invention enables the preparation of stannous catechol derivatives of formulas III, IV and V as described above in high yields, usually above 90% of theory, and using a markedly reduced reaction time. In addition, the process can be easily carried out at ambient temperature and pressure, and the reaction products are easily isolated and purified.

The following examples are presented to further illustrate the invention without any intention to be limited thereby. All parts and percentages are by weight unless otherwise specified.

EXAMPLE 1

Preparation of [1,2-benzenediolato (2-)] tin (II).

To a reaction vessel containing a solution of 405 g. of stannous octanoate in 500 ml. anhydrous ether at 20°C. was added rapidly with stirring, 110 g. of catechol in 500 ml. of anhydrous ether and a precipitate was immediately formed. The solution was stirred for 15 minutes to insure complete reaction and filtered. A white crystalline solid was recovered which was washed by adding the solid to a reaction vessel containing about 500 ml. of ether and stirring the mixture. After filtration and drying, 224 g. (98% of theory) of product was obtained.

Analysis calculated for $C_6H_4O_2Sn$: Percent C 31.76 H 1.78

Found: Percent C 31.41 H 1.91

EXAMPLE 2

Preparation of [4-methyl-1,2-benzenediolato (2-)] tin (II).

The procedure of Example 1 was used to react 12.4 g. of 4-methyl catechol in anhydrous ether with 40.5 g. of stannous octanoate in anhydrous ether to yield 23.82 g. (98% of theory) of purified [4-methyl-1,2-benzenediolato (2-)] tin (II).

Analysis calculated for $C_7H_6O_2Sn$: Percent C 34.89 H 2.51

Found: Percent C 33.85 H 2.47

EXAMPLE 3

Preparation of [3-methyl-1,2-benzenediolato (2-)] tin (II).

A solution of 40.5 g. of stannous octanoate in anhydrous ether was reacted with 12.4 g. of 3-methyl catechol in anhydrous ether as described in Example 1. Total reaction time was about 20 minutes. A purified product weighing 21.8 g. (91% of theory) was obtained.

Analysis calculated a $C_7H_6O_2Sn$: Percent C 34.89 H 2.51

Found: Percent C 33.64 H 2.54

EXAMPLE 4

Preparation of [3,4,5,6-Tetrabromo-1,2-benzenediolato (2-)] tin (II).

Using the procedure of Example 1, 42.7 g. of 3,4,5,6-tetrabromocatechol in anhydrous ether and 40.5 g. of stannous octoate in anhydrous ether were reacted. As a product, 52.7 g. of [3,4,5,6-tetrabromo-1,2-benzenediolato (2-)] tin (II) was obtained.

Analysis calculated as $C_6Br_4O_2Sn$: Percent C 13.27 Br 58.9

Found: Percent C 14.06 Br 57.4

EXAMPLE 5

Preparation of [tert-Butyl-1,2-benzenediolato (2-)] tin (II).

To a reaction vessel containing 40.5 g. (0.1 mole) of stannous octanoate in 300 ml. of anhydrous ether was added rapidly with stirring 16.6 g. of tert-butyl catechol in 100 ml. of anhydrous ether. A voluminous precipitate was immediately formed. The mixture was stirred for 30 minutes, filtered, washed several times with ether and dried. A white solid product was obtained weighing 27.2 g. (95.4% of theory).

Analysis calculated as $C_{10}H_{12}O_2Sn$: Percent C 42.43 H 4.28

Found: Percent C 42.30 H 4.30

EXAMPLE 6

Preparation of [4-nitro-1,2-benzenediolato (2-)] tin (II).

Using the procedure of Example 5, anhydrous ether solutions of 7.75 g. of 4-nitro catechol and 20.3 g. of stannous octanoate were reacted to yield 10.9 g. (98% of theory) of purified product.

Analysis calculated as $C_6H_3NO_4Sn$: Percent C 26.50 H 1.11 N 5.15

Found: Percent C 26.13 H 1.57 N 3.61

EXAMPLE 7

Preparation of [Hydroxy methoxy phenolato (1-)] tin (II) octanoate.

Using the procedure of Example 5, a solution of 14. g. of 3-methoxy catechol in ether and a solution of 40.5 g. of octanoate were reacted at 20°C. to give 25.8 g. of a product which was filtered, washed several times with ether and dried. Analysis by nuclear magnetic resonance determined the product to be a mixture containing 95% [2-hydroxy-3-methoxyphenolato (1-)] tin (II) octanoate and 5% [2-hydroxy-6-methoxyphenolato (1-)] tin (II) octanoate.

Analysis calculated for $C_{15}H_{22}O_5Sn$: Percent C 44.9 H 5.53

Found: Percent C 44.77 H 5.78

EXAMPLE 8

Flexible Polyurethane Foam

A flexible polyurethane foam-forming reaction mixture was prepared consisting of the following ingredients in the indicated proportions:

| Ingredients | Amount |
| --- | --- |
| Oxypropylated glycerin (mol. wt. 3,000) | 100.0 gms. |
| Silicone surfactant DC-192* | 1.5 mls. |
| 1,4-Diazabicyclo [2.2.2] octane** | 0.4 mls. |
| Water | 4.0 mls. |
| Stannous catalyst | 0.6 mls. |
| Toluene diisocyanate (80/20 mixture of 2,4 and 2,6 isomers) | 41.0 mls. |

*Dow Corning 192. This surfactant is a block copolymer of polydimethylsiloxane and a polyether resin.
**33% solution in dipropylene glycol.

In a formulation, the stannous catalyst used, [1,2-benzenediolato (2-)] tin (II) was dispersed at ambient temperature in the oxypropylated glycerin. Water, the surfactant and 1,4-diazabicyclo [2.2.2] octane were then added and blended together by stirring. Toluene diisocyanate was then added and after a final brief blending the mixture was poured into an open-top form whereupon foaming of the reaction mixture occurred. The peak of foam rise occurred 58 seconds after the addition of toluene diisocyanate. The gel time of the foam was 5 seconds as determined by resistance to penetration by probing with a rod. A foam having a tack-free surface was obtained after curing in an oven at 120°C. for 15 minutes. When cut open, this foam exhibited no splits, nor void cavities and no closed cell membranes were visible.

EXAMPLE 9

Flexible Polyurethane Foam

Using the formulation and procedure of Example 8, 1.0 g. of a mixture of 95% of [2-hydroxy-3-methoxyphenolato (1-)] tin (II) octanoate and 5% of [2-hydroxy-6-methoxyphenolato (1-)] tin (II) octanoate was used as the gel catalyst. The peak of the foam rise occurred 65 seconds after the addition of toluene diisocyanate. The gel time of the foam was determined to be about 5 seconds. A foam having a tack-free surface was obtained after curing in an oven at 110°C. for 15 minutes.

EXAMPLE 10

Flexible Polyurethane Foam

The formulation and procedure of Example 8, were used in which 1 g. of [3,4,5,6-tetrabromo-1,2-benzenediolato (2-)] tin (II) was employed as the gel catalyst. The peak of the foam rise occurred 80 seconds after the addition of the toluene diisocyanate. Gel time of the foam was 10 seconds. A foam having a tack-free surface was obtained after curing in an oven at 110°C. for 15 minutes.

EXAMPLE 11

Flexible Polyurethane Foam

Employing the formulation of Example 8, 1 g. of [4-nitro-1,2-benzenedialato (2-)] tin (II) was dispersed in the oxypropylated glycerine. In addition, 1 g. of N-methyl morpholine was added to the water, surfactant and 1,4-diazabicyclo [2.2.2] octane and blended together by stirring. Toluene diisocyanate was then added and after a final brief blending, the foam was produced as in Example 8. The peak of the foam rise occurred 100 seconds after the addition of the toluene diisocyanate. The gel time of the foam was determined to be about 45 seconds. After curing at 110°C. for 15 minutes a foam having a tack-free surface was obtained.

What is claimed is:

1. A process for preparing stannous catechol derivatives which comprises reacting, in the presence of an inert organic solvent, a catechol of the formula:

I wherein each of R, $R_1$, $R_2$, and $R_3$ is independently selected from the group consisting of hydrogen, halogen, nitro, alkyl having 1 to about 10 carbon atoms and alkoxy having 1 to about 10 carbon atoms, with a stannous carboxylate of the formula:

$$(R_4COO)_2 Sn$$

II to produce a stannous catechol derivative selected from the group consisting of:

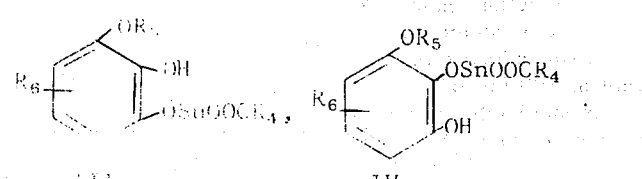

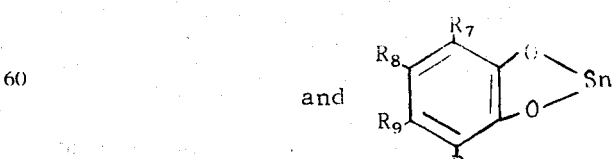

wherein $R_4$ is selected from the group consisting of hydrogen, alkyl having 1 to about 9 carbon atoms and alkenyl having 1 to about 9 carbon stoms, $R_5$ represents alkyl having from 1 to about 10 carbon atoms, $R_6$ represents hydrogen, halogen, nitro or alkyl having 1 to about 10 carbon atoms, and each of $R_7$, $R_8$, $R_9$, and $R_{10}$ independently represents hydrogen, halogen, nitro and alkyl having 1 to about 10 carbon atoms.

2. The process of claim 1 wherein $R_4$ is selected from the group consisting of alkyl having from about 5 to about 9 carbon atoms and alkenyl having from about 5 to about 9 carbon atoms.

3. The process of claim 2 wherein each of R, $R_1$, $R_2$ and $R_3$ is independently selected from the group consisting of hydrogen, halogen selected from the group consisting of chlorine and bromine, nitro, alkyl having 1 to about 4 carbon atoms and alkoxy having 1 to about 4 carbon atoms.

4. The process of claim 3 wherein said inert organic solvent has a boiling point of from about 30° to about 90°C.

5. The process of claim 4 wherein said inert solvent is selected from the group consisting of diethyl ether, acetone, dioxane, methanol, methyl ethyl ketone and ethanol.

6. The process of claim 5 wherein said reaction is carried out at a temperature of from about 20° to about 40°C.

7. The process of claim 6 wherein said catechol is selected from the group consisting of tetrabromo catechol, nitro catechol, methyl catechol and tert-butyl catechol.

8. The process of claim 7 in which said stannous carboxylate is selected from the group consisting of stannous octanoate and stannous 2-ethyl hexanoate.

9. A stannous catechol derivative represented by the formula selected from

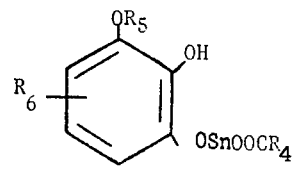

and

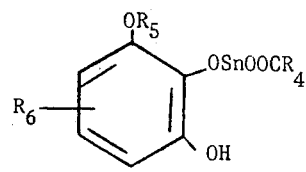

wherein, as applied to each of said formulas, $R_4$ is selected from the group consisting of hydrogen, alkyl having from 1 to about 9 carbon atoms and alkenyl having from 1 to about 9 carbon atoms, $R_5$ represents an alkyl having from 1 to about 10 carbon atoms, and $R_6$ is selected from the group consisting of hydrogen, halogen, nitro or alkyl having from 1 to about 10 carbon atoms.

10. The stannous catechol derivative of claim 9 wherein $R_6$ is hydrogen.

11. The stannous catechol derivative of claim 10 wherein $R_4$ is an alkyl having from 5 to about 9 carbon atoms and $R_5$ is an alkyl having from 1 to about 4 carbon atoms.

12. The stannous catechol derivative of claim 11 selected from the group consisting of [2-hydroxy-3-methoxyphenolato (1-)] tin (II) octanoate, [2hydroxy-6-methoxyphenolato (1-)] tin (II) octanoate, [2-hydroxy-3-methoxyphenolato (1-)] tin (II) ethylhexanoate, [2-hydroxy-6-methoxyphenolato (1-)] tin (II) ethylhexanoate and [2-hydroxy-3-methoxyphenolato (1-)] tin (II) hexanoate.

13. The stannous catechol derivative of claim 12 identified as [2-hydroxy-3-methoxyphenolato (1-)] tin (II) octanoate.

* * * * *

UNITED STATES PATENT OFFICE
CERTIFICATE OF CORRECTION

Patent No. 3,899,520        Dated August 12, 1975

Inventor(s) Bruce G. van Leuwen and James J. Pitts

It is certified that error appears in the above-identified patent and that said Letters Patent are hereby corrected as shown below:

Column 4, line 47, "tetrabromo-1,2-benzenedialoto" should read --tetrabromo-1,2-benzenediolato--.

Column 5, line 5, "described above gel catalysts" should read --described above as gel catalysts--.

Column 5, line 29, "these material" should read --these materials--.

Column 7, line 1, "g. of octanoate" should read --g. of stannous octanoate--.

Column 8, lines 25-35, (Formula I) should read

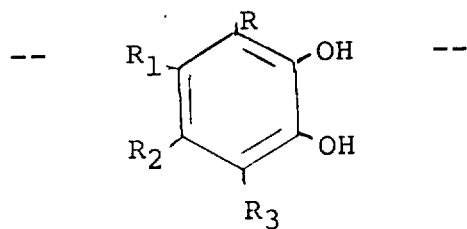

Column 8, lines 50-55, (Formula III) should read

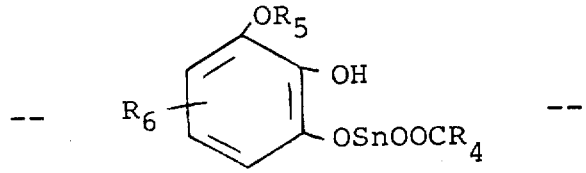

PO-1050
(5/69)

UNITED STATES PATENT OFFICE
CERTIFICATE OF CORRECTION

Patent No. 3,899,520     Dated August 12, 1975

Inventor(s) Bruce G. van Leuwen and James J. Pitts    PAGE - 2

It is certified that error appears in the above-identified patent and that said Letters Patent are hereby corrected as shown below:

Column 8, line 69 "stoms" should read --atoms--.

Signed and Sealed this

*thirtieth* Day of *December 1975*

[SEAL]

Attest:

RUTH C. MASON
*Attesting Officer*

C. MARSHALL DANN
*Commissioner of Patents and Trademarks*